United States Patent
Feng (10) Patent No.: US 8,560,227 B2
(45) Date of Patent: Oct. 15, 2013

(54) ROUTE PLANNING APPARATUS AND METHOD FOR NAVIGATION SYSTEM

(75) Inventor: Kyte Feng, Torrance, CA (US)

(73) Assignee: Alpine Electronics, inc., Tokyo (JP)

(*) Notice: Subject to any disclaimer, the term of this patent is extended or adjusted under 35 U.S.C. 154(b) by 754 days.

(21) Appl. No.: 12/386,418

(22) Filed: Apr. 17, 2009

(65) Prior Publication Data
US 2010/0268449 A1 Oct. 21, 2010

(51) Int. Cl.
- G01C 21/00 (2006.01)
- G01C 21/34 (2006.01)
- G01C 21/36 (2006.01)

(52) U.S. Cl.
CPC .......... *G01C 21/343* (2013.01); *G01C 21/3679* (2013.01)
USPC .......................................... 701/426; 701/467

(58) Field of Classification Search
USPC .................. 701/201, 206, 426, 467
See application file for complete search history.

(56) References Cited

U.S. PATENT DOCUMENTS

| | | | |
|---|---|---|---|
| 6,278,938 B1 | 8/2001 | Alumbaugh | |
| 6,975,938 B2 | 12/2005 | Odagawa et al. | |
| 7,444,237 B2* | 10/2008 | Dale | 701/202 |
| 2006/0167621 A1* | 7/2006 | Dale | 701/202 |
| 2009/0018766 A1* | 1/2009 | Chen et al. | 701/202 |
| 2009/0210148 A1* | 8/2009 | Jayanthi | 701/206 |
| 2009/0234577 A1* | 9/2009 | Rinscheid | 701/201 |
| 2010/0076677 A1* | 3/2010 | Bussmann et al. | 701/206 |

* cited by examiner

*Primary Examiner* — Amee A Shah
(74) *Attorney, Agent, or Firm* — Muramatsu & Associates (57) ABSTRACT

A route planning system and method for a navigation system which allows the driver to intelligently plan the route when adding waypoints. The route planning navigation system includes a route planning processor which allows the driver to add and prioritize multiple POIs as waypoints. When one or more new waypoints are added, the driver is allowed to prioritize the waypoints if adding new waypoints does not significantly increase the cost of the route, and an optimized route is generated accordingly. In another aspect, if adding new waypoint significantly increases the cost of the route, a notifying message will be generated by the route planning processor so that the driver is able to make a decision whether to proceed to the new waypoint.

6 Claims, 9 Drawing Sheets

Adding waypoint will significantly increase the route:

Original planned route: 100 miles
New route: 142 miles

Do you want to proceed?

Yes        No

FIG. 7

ROUTE PLANNING APPARATUS AND METHOD FOR NAVIGATION SYSTEM

FIELD OF THE INVENTION

This invention relates to a route planning apparatus and method for a navigation system, and more specifically, to a route planning apparatus and method for a navigation system which allows the driver to intelligently plan the route by providing an opportunity to add, prioritize, etc. waypoints during a travel to the destination.

BACKGROUND OF THE INVENTION

Recently, vehicle navigation systems have become more popular and affordable for most vehicle drivers. The navigation system can, not only determine the driver's current position by utilizing the Global Positioning System (GPS), but also provide different routing information between the vehicle's current position and the destination. In order to perform above noted functions, the navigation system is usually equipped with navigation computer programs and one or more detailed database to store and provide maps, road networks, geographical features, waypoints, and point-of-interest (POI) information.

A "waypoint" is defined as an intermediate point (intermediate destination or tentative destination) on a route or a line of travel. Sometimes, when driving on a planned (calculated) route produced by the navigation system, the driver may want to stop-by somewhere along the route (i.e. waypoint) before reaching the final destination. Most navigation systems are capable of recalculating the route and providing the driver a new route to the waypoint, then to the destination.

Figure 1:
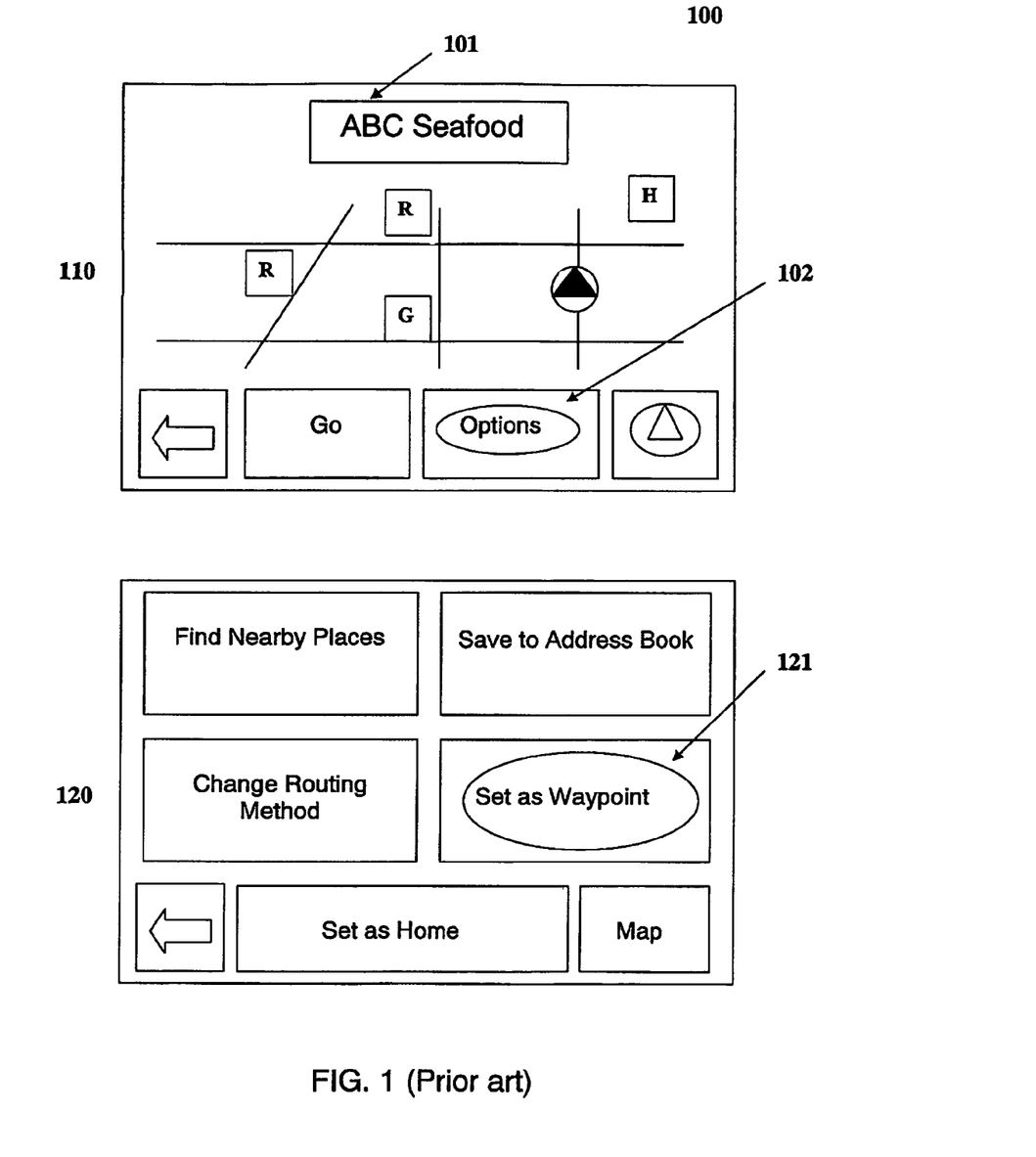
FIG. 1 illustrates an example of conventional navigation displays involving in a waypoint setting procedure in which the driver has to set the waypoint with some extra steps through the displays 110 and 120.

However, as illustrated in FIG. 1, after a waypoint POI 101 (e.g. ABC Seafood) is specified by the driver in a navigation system 100, the driver has to click on an "Options" button 102 on a screen 110 and a "Set as Waypoint" button on a screen 120, to finalize the waypoint setting. This waypoint setting process may be inconvenient and time-consuming for the driver, especially the first-time user of the navigation system, to figure out how to set the POI 101 as a waypoint. Furthermore, if the driver operates the navigation system 100 while driving, this waypoint setting process may significantly increase the possibility of driver distraction from the safe driving.

Figure 2:
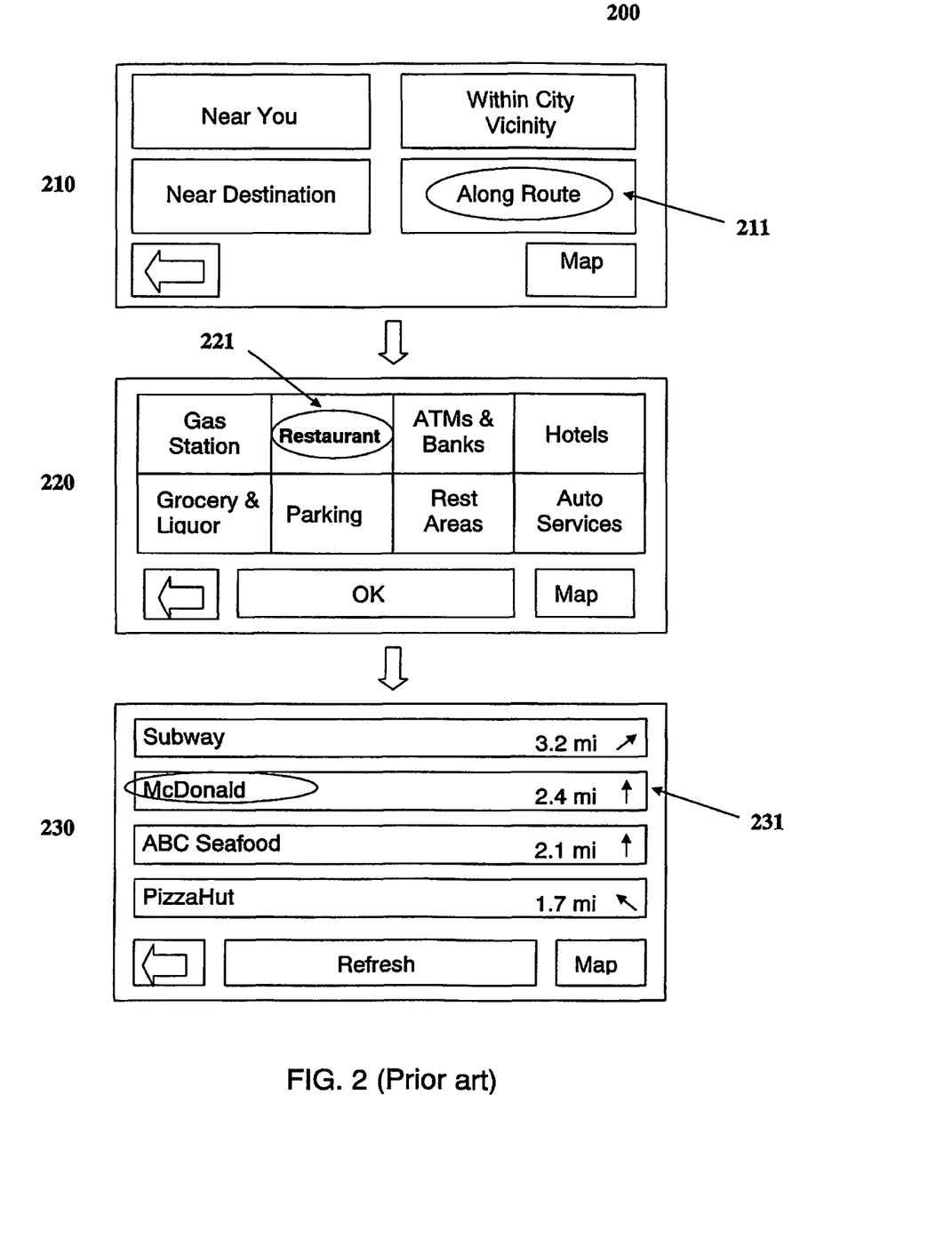
FIG. 2 illustrates another example of conventional navigation displays involving an automatic waypoint setting system procedure in which the waypoint is set through the display screens 210, 220 and 230.

To solve the problems involved in the conventional example of FIG. 1, a system 200 has been developed to automatically set a POI as a waypoint as shown in FIG. 2. The system of FIG. 2 shows another conventional example involved in the navigation system to select a waypoint to visit before reaching the final destination. In viewing a screen 210, the driver starts the waypoint setting process by clicking an "Along Route" button 211.

Then, the navigation system 200 shows a screen 220 which lists categories of POIs as shown at about the middle of FIG. 2. Thus, the driver is able to further select the POI category 221 (e.g. Restaurant) from the list. In response to the POI category input by the driver, the navigation system 200 then provides detailed POI information (e.g. Restaurant names, telephone numbers, distances, etc.) to the driver on a screen 230.

Based on the detailed information, the driver can select a desired POI as a waypoint. Once a specific POI (e.g. McDonald) 231 is selected, the navigation system 200 automatically sets the POI 231 as the waypoint (a tentative destination before the final destination). With fewer steps in waypoint setting, this system not only reduces the possibility of driver distraction, but also provides a convenient and efficient means for waypoint setting.

Figure 2A:
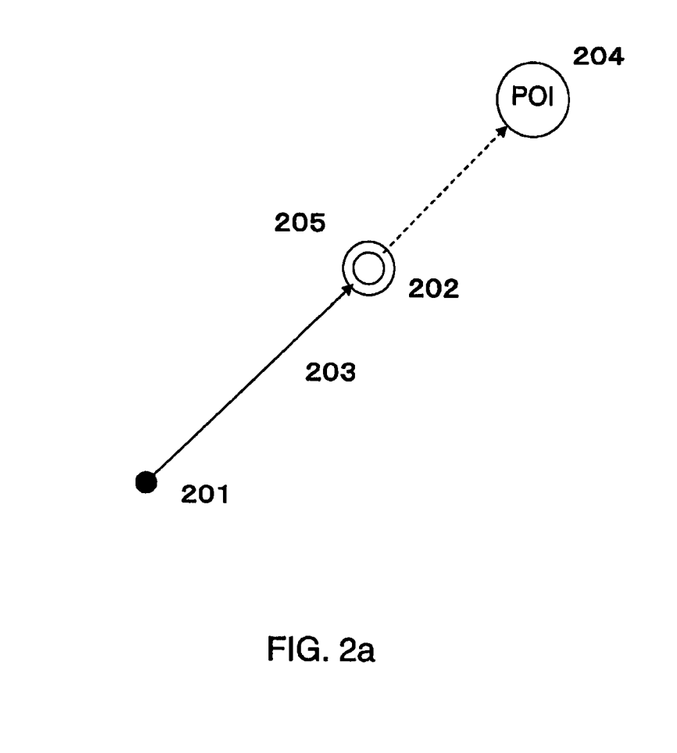
FIGS. 2a and 2b illustrate some problems involved in the automatic waypoint procedure of the conventional navigation system of FIG. 2.

However, some problems may occur in the above mentioned waypoint setting procedure for the navigation system. For example, as shown in FIG. 2a, when a POI 204 is located even further than a destination 202 (from a starting point 201), it is unrealistic and unreasonable to automatically set the POI 204 as the waypoint since the distance to the POI 204 is much longer (203 plus 205) than the distance (203) to the destination 202. Thus, instead of setting the POI 204 as the waypoint automatically, the navigation system should be able to calculate and compare the distances to the destination 202 and to the POI 204. Then, the navigation system should provide routing information to the driver so that the driver can be notified to make a judgement so as to avoid unnecessary routing, especially when the gas price is so high in the present time.

Figure 2B:
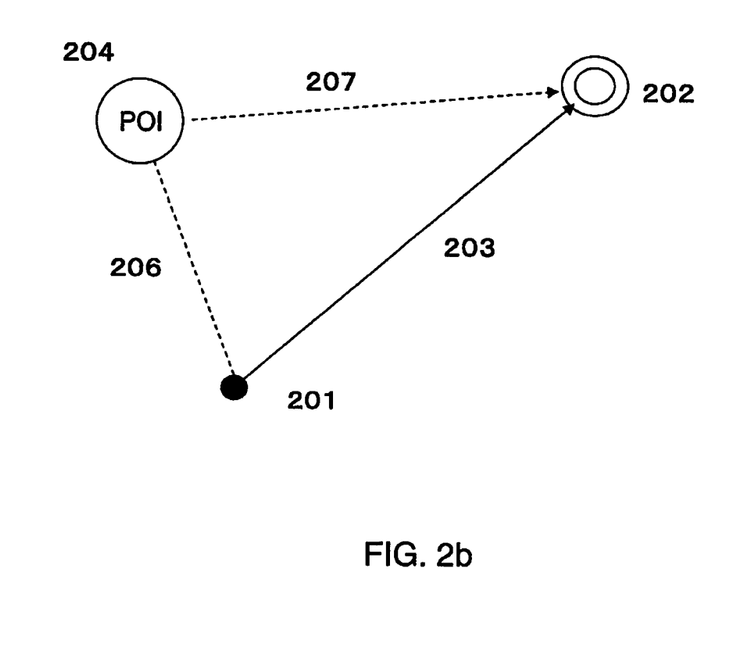

Likewise, as can be seen in FIG. 2b, even though the distance (206) to the POI 204 from the starting point 201 seems shorter than the originally planned route 203, adding the POI 204 as the waypoint may significantly increase the total route (206 plus 207) to the destination 202. As mentioned above, in such a situation, the navigation system should be capable of calculating and comparing the routes, and the driver should be notified about the routing information to avoid the unnecessary routing.

U.S. Pat. No. 6,975,938 issued to Odagawa et al. discloses a drive plan producing device to generate a tour plan, which is automatically produced to cover the plurality of candidate places obtained based on the base contents within a predetermined range. However, when adding a candidate place may significantly increase the route, the navigation system of Odagawa et al. does not provide any notifying message to the driver to decide whether to proceed to the candidate place. Also, the system of Odagawa et al. does not allow the driver to prioritize the candidate places based on the driver's preference U.S. Pat. No. 6,278,938 issued to Alumbaugh discloses a navigation system which provides a function to automatically collect, analyze and refine the waypoints for their intended purposes. However, like the Odagawa et al. '938 patent discussed above, when adding the waypoint may significantly increase the overall length of the route, the navigation system of Alumbaugh does not provide any notifying message to the driver to decide whether to proceed to the waypoint or not. In addition, when there are multiple waypoints, the navigation system of Alumbaugh does not allow the driver to prioritize the waypoints based on the driver's preference.

Therefore, there remains a need for a new and improved route planning apparatus and method for a navigation system which allows the driver to add, select, and prioritize the waypoints such as POIs, and provides a notifying message to let the driver know when adding the waypoint or POI would significantly increase the overall distance of the route.

SUMMARY OF THE INVENTION

It is, therefore, an object of the present invention to provide a route planning method and apparatus for a navigation system, which offers a convenient platform for a driver to plan the route by adding and prioritizing multiple "Points-of-interests" (POIs) or waypoints, based on the driver's preferences.

It is another object of the present invention to provide function for notifying a message to the driver when adding a new waypoint or POI may significantly increase the length of the route or burden of driving the route, such that the driver can decide whether to proceed to the POI or waypoint, or to avoid the unnecessary routing.

It is another object of the present invention to generate an optimized route for the driver based on the driver's routing preferences.

It is a further object of the present invention to allow the driver to set a "threshold" value to decide whether adding the new waypoint or POI significantly increases the distance or cost of the route.

Usually, navigation software programs are adapted to determine the threshold value as to whether adding the new waypoint or POI will significantly increase the route. The threshold value is determined according to the information including, but not limited to, customer surveys, marketing research, road network and map data. For example, the threshold value can be 25%, meaning that a notifying message will be provided to the driver if adding the new waypoint or POI increases the route by at least 25%.

Since the gas price or energy cost is so high recently, the threshold value can be even lower than the above example, such as 20%, to help the driver avoid unnecessary routing. The navigation software programs may provide a default threshold value when the navigation system is first delivered to a driver. However, the driver is also allowed to set the threshold value based on the driver's preference or different circumstances while driving.

According to one aspect of the present invention, a route planning navigation system comprises a display unit configured to display maps, POI and routing information; an information receiver adapted to receive information about current location of a vehicle from a global positioning system (GPS); at least one database to store and provide maps, road networks, geographical features, and waypoint or POI information; and a route planning processor which is programmed to retrieve the map and road network data from the database, determine whether adding a new waypoint or POI will significantly increase the route, provide a notifying message to the driver, and generate an optimized route covering all waypoints or POIs, and a destination.

The route planning processor may include a computation unit adapted to provide routing information by calculating and comparing the distance of an existing route with the distance of any possible routing covering newly-added waypoint or POI. For example, when the driver adds new waypoints or POIs, the computation unit starts calculating and comparing the distance of the existing route with the distance of any possible route covering the new waypoint or POI. If adding the new waypoint or POI does not significantly increase the route, the driver is allowed to prioritize the waypoints or POIs, and an optimized route is generated according to the distances between the vehicle's current position, the waypoint(s) or POI(s), and the destination.

In a further embodiment, when adding the POI will significantly increase the route, a notifying message provided by the route planning processor is shown on the display unit, such that the driver can make a decision whether to proceed to the new waypoint or POI. If the driver decides to proceed to the new POI before reaching the destination, the computation unit again calculates and compares the distance of every possible route, and an optimized route is determined by the route planning processor according to the routing information, map and road network information retrieved from the database, and information of current vehicle position retrieved from a global positioning system (GPS).

In another aspect, a route planning method according to the present invention includes the steps of: configuring at least one database which associates road network data, map data and geographical features, and POI information; providing an option for the driver to add more waypoints or POIs; displaying various POI categories and detail POI information in a specific POI category selected by the driver; adding a new waypoint or POI; calculating and comparing the distance of the existing route and any possible new route covering the newly added waypoint or POI, providing a notifying message to the driver to prioritize the waypoints or POIs when adding new waypoint or POI does not significantly increase the route; and generating an optimized route based on the driver's prioritizing preference.

In a further embodiment, when adding the new waypoint or POI significantly increases the route, the route planning method in the present invention includes a step of providing a notifying message to the driver to decide whether to proceed to the new waypoint or POI. If the driver decides to proceed to the new waypoint or POI, the route planning method further includes the steps of calculating and comparing the distance of every possible route, and generating an optimized route covering all waypoints or POIs, and the destination.

On the other hand, if the driver decides not to proceed to the new waypoint or POI, the driver can either reselect the waypoint or POI, or stay on the existing route.

According to the present invention, the route planning apparatus and method for a navigation system allows the driver to add, select, and prioritize the waypoints such as POIs, and provides a notifying message to let the driver know when adding the waypoint or POI would significantly increase the overall distance, time, etc. of the route. The route planning method and apparatus for a navigation system allows the driver to plan the route by adding and prioritizing multiple waypoints or POIs based on the driver's preferences. The navigation system of the present invention provides a function for notifying a message to the driver when adding a new waypoint or POI may significantly increase the length of the route or burden of driving the route, such that the driver can decide whether to proceed to the POI or waypoint, or to avoid the unnecessary routing.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described in the following.

The present invention relates to a route planning apparatus and method. More specifically, this invention relates to a navigation-based route planning apparatus and method which allows the driver to add one or more new waypoints or points-of-interests (POIs) to an existing route. The existing route here typically means that an optimum route to the final destination that is produced by the navigation system, and the waypoint is an intermediate destination or tentative destination that the driver wants to stop-by before (or even after) reaching the original destination.

Further, in the present invention, the driver can prioritize the new and existing waypoints or POIs based on the driver's preference. If adding the new waypoint or POI to the existing route significantly increases the overall cost (distance, time, etc.), a notifying message is generated so that the driver is able to make an informed decision whether to proceed to the new waypoint or not. If the driver decides to proceed anyway, an optimized new route is generated accordingly.

Furthermore, a threshold value to determine as to whether adding the new waypoint or POI "significantly increases" the cost of the route can be defined by the navigation software program. For example, the threshold can be set as 25%, meaning that the notifying message, such as "Adding the new waypoint or POI will significantly increase the route, do you want to proceed?" will be provided to the driver if adding the new waypoint or POI will increase the cost, such as a distance of the route, by 25% or more. The threshold value can also be set by the driver based on the driver's preference and driving conditions. In one embodiment, the threshold value can be 20% or lower.

Figure 3:
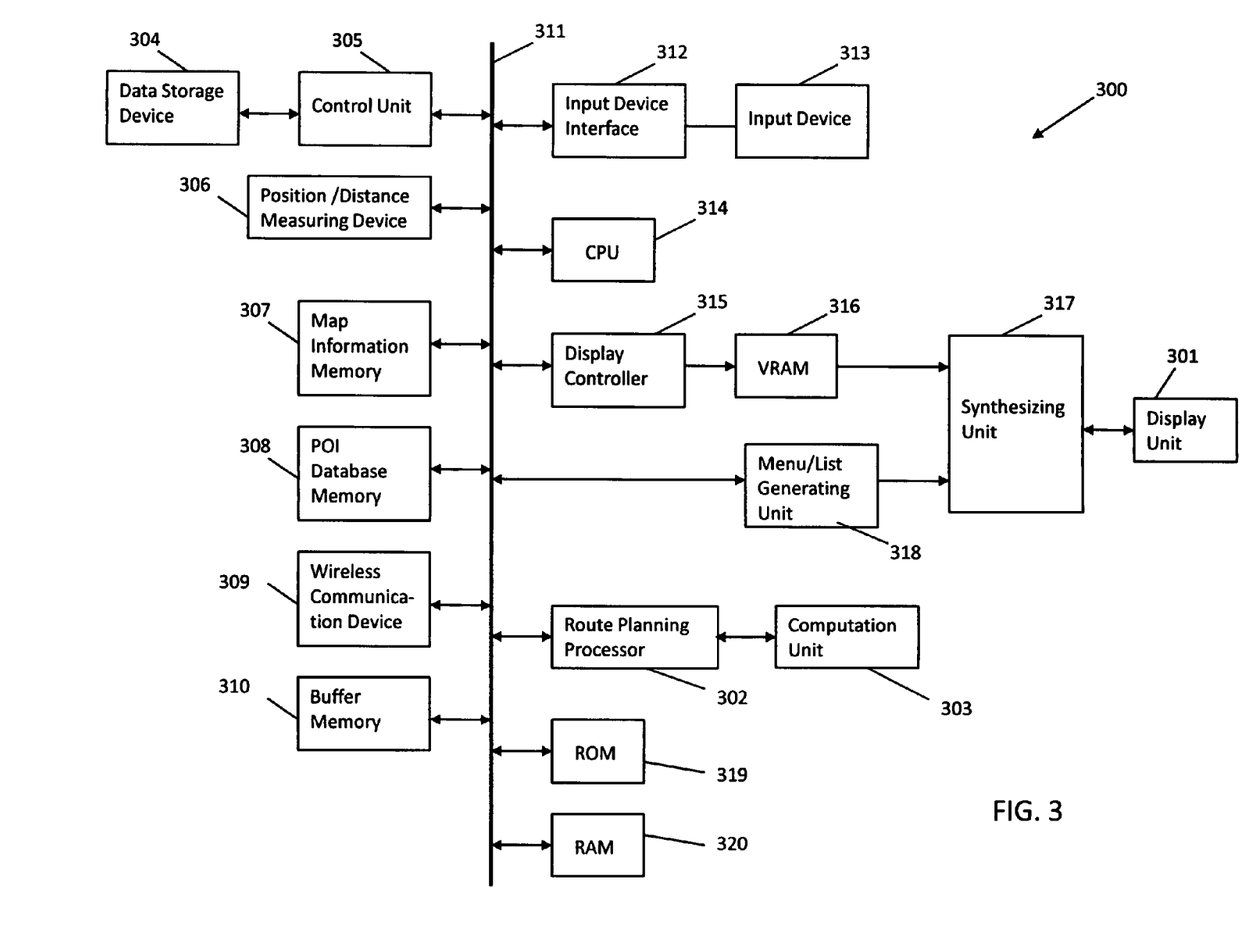
FIG. 3 illustrates a functional block diagram showing an example of structure of a vehicle navigation system implementing the route planning apparatus and method of the present invention.

FIG. 3 is a block diagram showing an example of structure of a vehicle navigation system 300 for implementing the present invention. As can be seen in FIG. 3, the navigation system 300 includes a display unit 301, a route planning processor 302 adapted to calculate and determine the route between the destination and the current vehicle position. The route planning processor 302 may include a computation unit 303, which is adapted to generate routing information by calculating and comparing the distance, time, etc. of the existing route with the distance of the new route.

The navigation system also includes a data storage device 304 such as a hard disc, CD-ROM, DVD or other storage means for storing the map data. The navigation system further includes a control unit 305 for controlling an operation for reading the information from the data storage device 304, and a position and distance measuring device 306 for measuring the present vehicle position or user position. For example, the position and distance measuring device 306 has a vehicle speed sensor for detecting a moving distance, a gyroscope for detecting a moving direction, a microprocessor for calculating a position, and a GPS (global positioning system) receiver for receiving GPS signals from artificial satellites for calculating a current position of the vehicle.

The block diagram of FIG. 3 further includes a map information memory 307 for storing the map information which is read from data storage device 304, a database memory 308 for storing database information such a point of interest (POI) information which is read out from the data storage device 304, an input device 313 for executing a menu selection operation, an enlarge/reduce operation, a destination input operation, etc. and an input device interface 312. In one embodiment, the input device 313 is a remote controller.

Still referring to FIG. 3, the navigation system 300 includes a bus 311 for interfacing the above units in the system, a processor (CPU) 314 for controlling an overall operation of the navigation system 300, a ROM 319 for storing various control programs such as a route search program and a map matching program necessary for navigation control, a RAM 320 for storing a processing result such as a guide route, a display controller 315 for generating map image (a map guide image and an arrow guide image) on the basis of the map information, a VRAM 316 for storing images generated by the display controller 315, a menu/list generating unit 318 for generating menu image/various list images, a synthesizing unit 317, a wireless communication device 309 to retrieve data such as traffic data from a remote server, and a buffer memory 310 for temporary storing data for ease of data processing.

Figure 6:
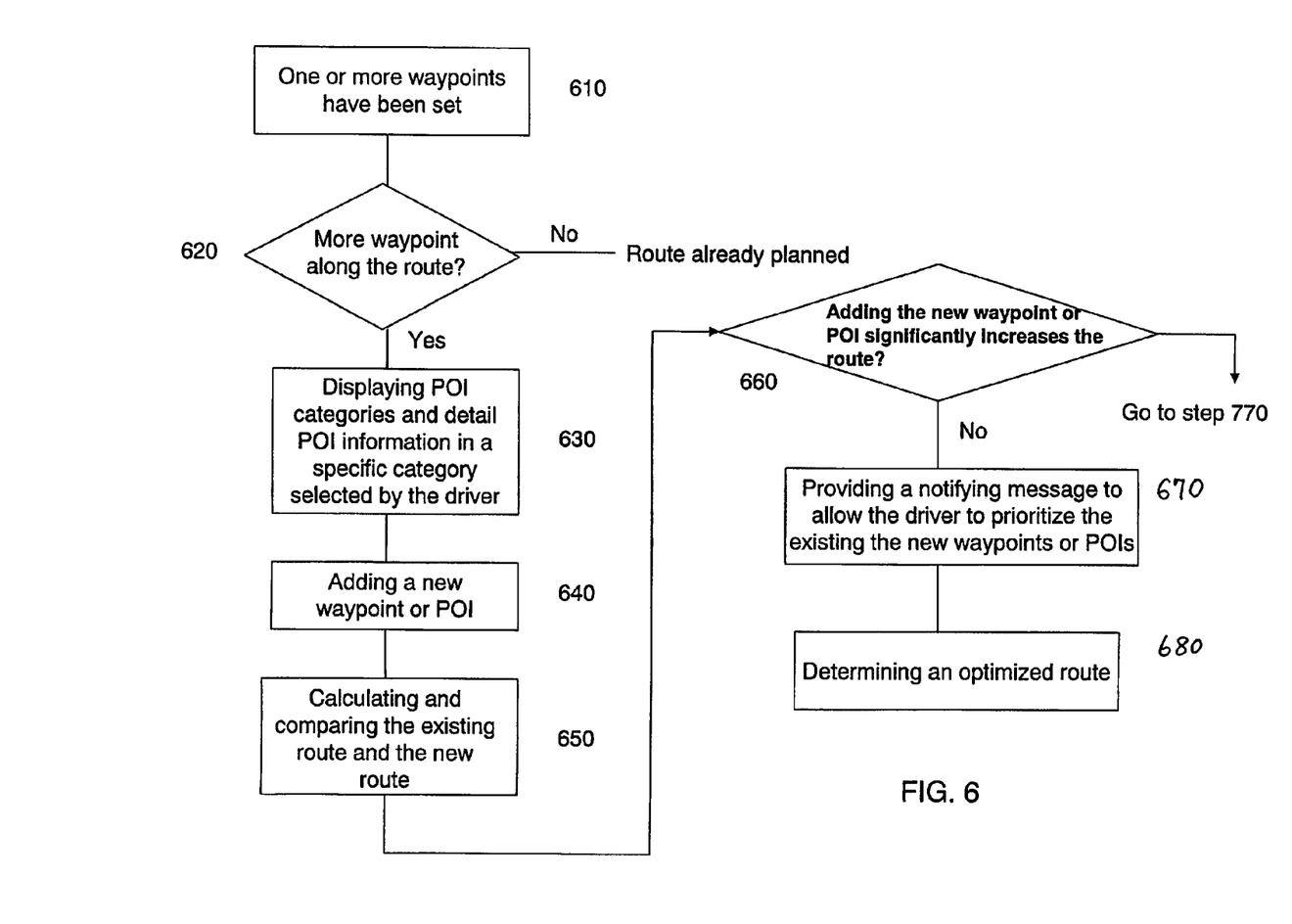
FIG. 6 is a flow chart illustrating an example of operational steps in the method of setting multiple waypoints or POIs in which adding one of the waypoints will significantly increase the cost of the route.
Figure 7:
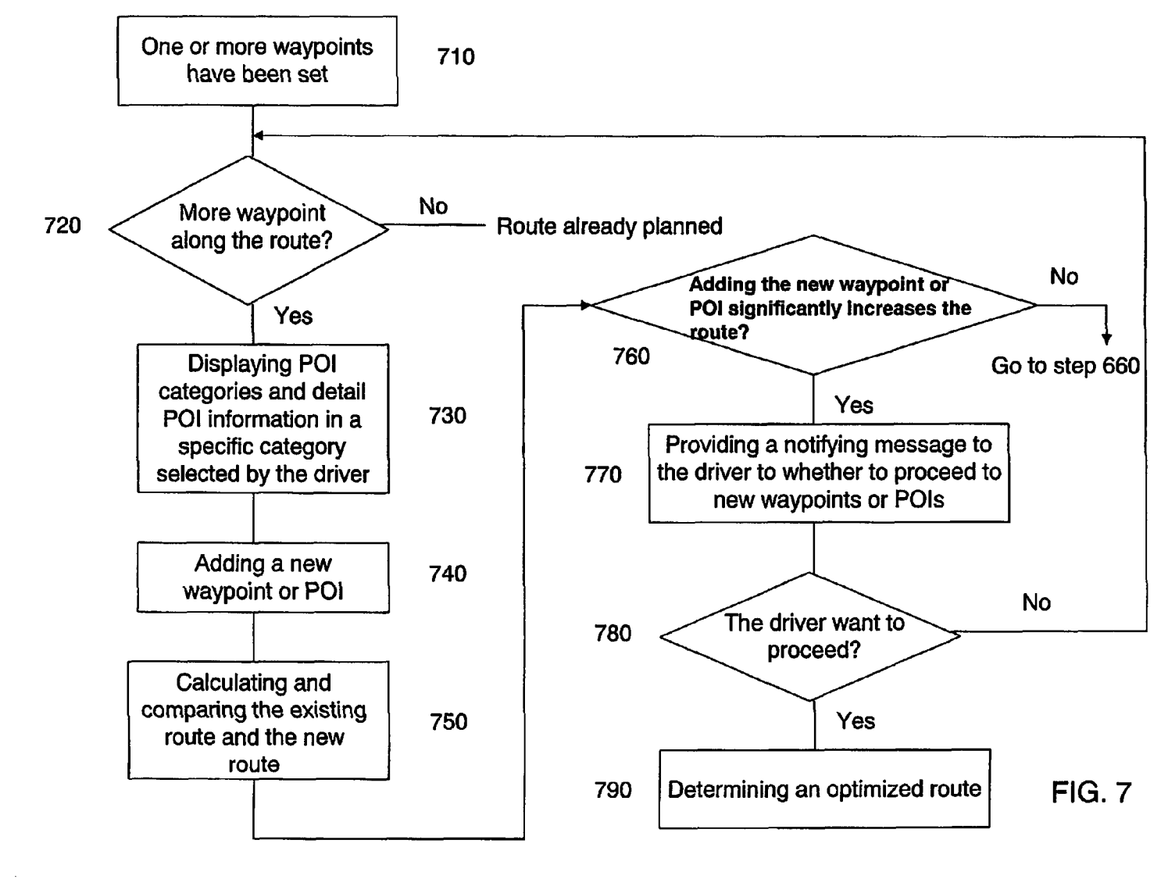
FIG. 7 is a flow chart illustrating another example of operational steps in the method of setting multiple waypoints or POIs in which adding one of the waypoints will significantly increase the cost of the route.

A program for conducting the operation of route planning in the present invention shown in the flow charts of FIGS. 6 and 7 is stored in the ROM 319 or other memory and is executed by the CPU 314 or the route planning processor 302. The buffer memory 309 may store the data concerning the cost such as a distance, travel time, road classes, etc. that may be associated with new routes to the waypoints that added by the driver. By comparing the costs of the routes, the navigation system generates the message to notify the driver as to the significant increase of burden to reach the selected waypoints.

Figure 3A:
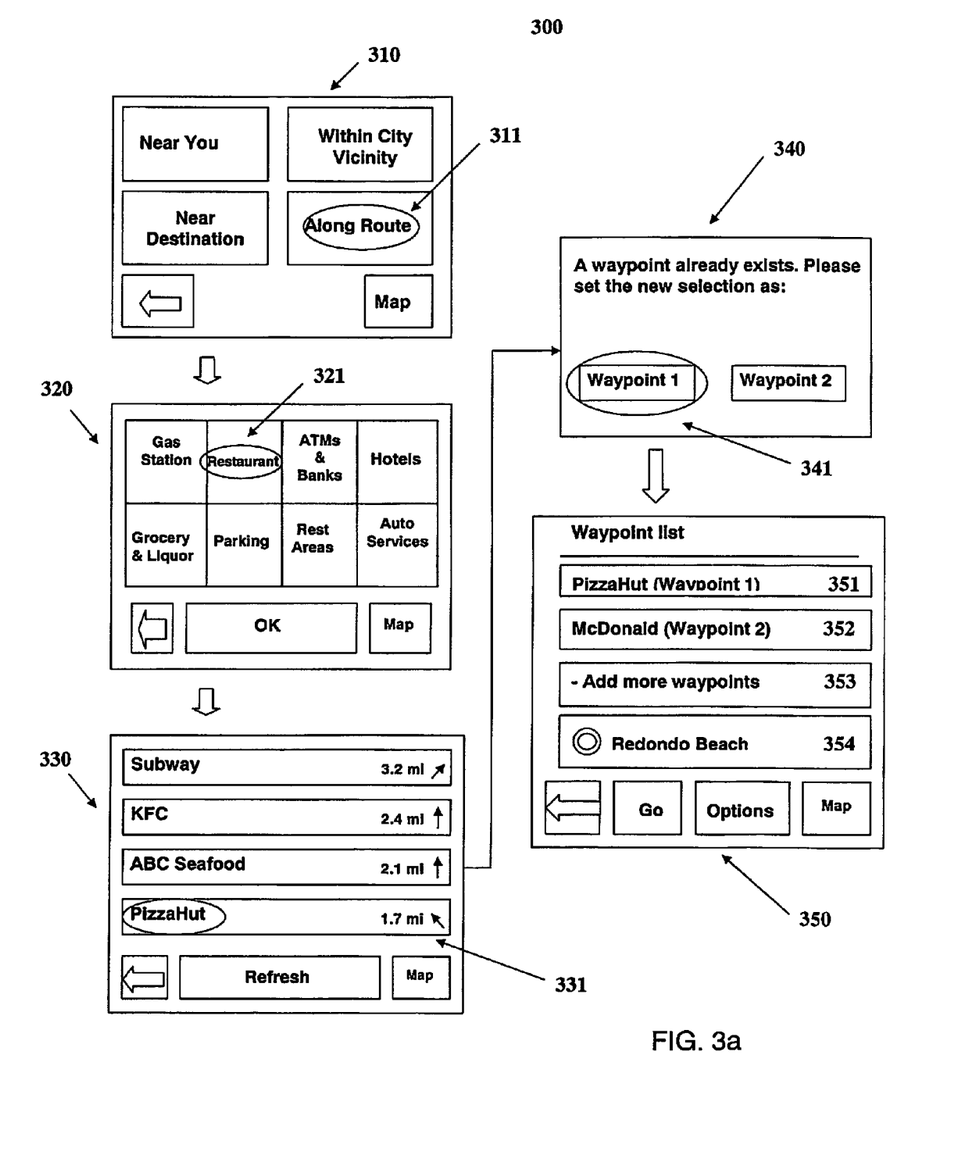
FIG. 3a illustrates one embodiment of the present invention in which the driver is allowed to prioritize multiple waypoints or POIs as tentative destinations before reaching the final destination where screens 310, 320, 330, 340 and 350 will be displayed by the navigation system during the route planning process.

The feature of the navigation (route planning) system 300 is further exemplified in FIG. 3*a* which shows examples of navigation screen implementing the route planning method of the present invention. Assuming that the driver has already set a waypoint "McDonald" 352 and a destination "Redondo Beach" 354. It is also assumed that the driver wants to set another waypoint or POI along the route, thus, the driver first selects "Along Route" 311 on a screen 310 shown at the top left of FIG. 3*a*.

Then, the navigation system 300 displays a screen 320 which provides a plurality of POI categories stored in the data storage device 304, including Gas Station, Restaurant, and Hospital, etc. If the driver selects a category "Restaurant" 321, then the navigation system 300 displays a screen 330 which provides detail information about the restaurants along the route. Since there is an existing waypoint ("McDonald"), when the driver adds another waypoint or POI ("PizzaHut") 331, the computation unit 303 starts calculating and comparing the cost (ex. distance) of the existing route with the new route.

If adding the new waypoint or POI does not significantly increase the overall cost of the route, a notifying message shown in a pop-up window 340 allows the driver to prioritize the POIs according to the driver's preference. If the driver selects the new POI ("PizzaHut") as a waypoint 1 (341), on the pop-up window 340, the navigation system 300 calculates a new route including the waypoint 1. The navigation system shows an optimized new route for the driver to each of waypoints (351, 352), and then to the destination (354) as shown in a screen 350 at the lower right of FIG. 3*a*.

The optimized new route is determined according to the information including, but not limited to, the routing information obtained from the computation unit 303, map and road network information retrieved from the data storage device 304, and information of current vehicle position retrieved from the position and distance measuring device 306 including the global positioning system (GPS). Furthermore, the navigation system 300 allows the driver to add more waypoints or POIs by simply clicking the "Add more waypoints" button 353 on the screen 350 and repeats the same steps involving the screens 310, 320, 330 and 340 to complete the waypoint setting process.

In another embodiment, when adding the waypoint or POI will significantly increase the route cost, as in the case of examples in FIGS. 2*a* or 2*b*, a notifying message provided by the route planning processor 302 is shown on the display unit 301, such that the driver can make a decision whether to proceed to the waypoint or POI as a tentative (intermediate) destination. If the driver decides to proceed to travel to the new POI before reaching the destination, the computation unit 303 again calculates and compares the distances (and other costs) of every possible route. As a result, the computation unit 303 determines an optimized route which is produced by the route planning processor 302.

Figure 4:
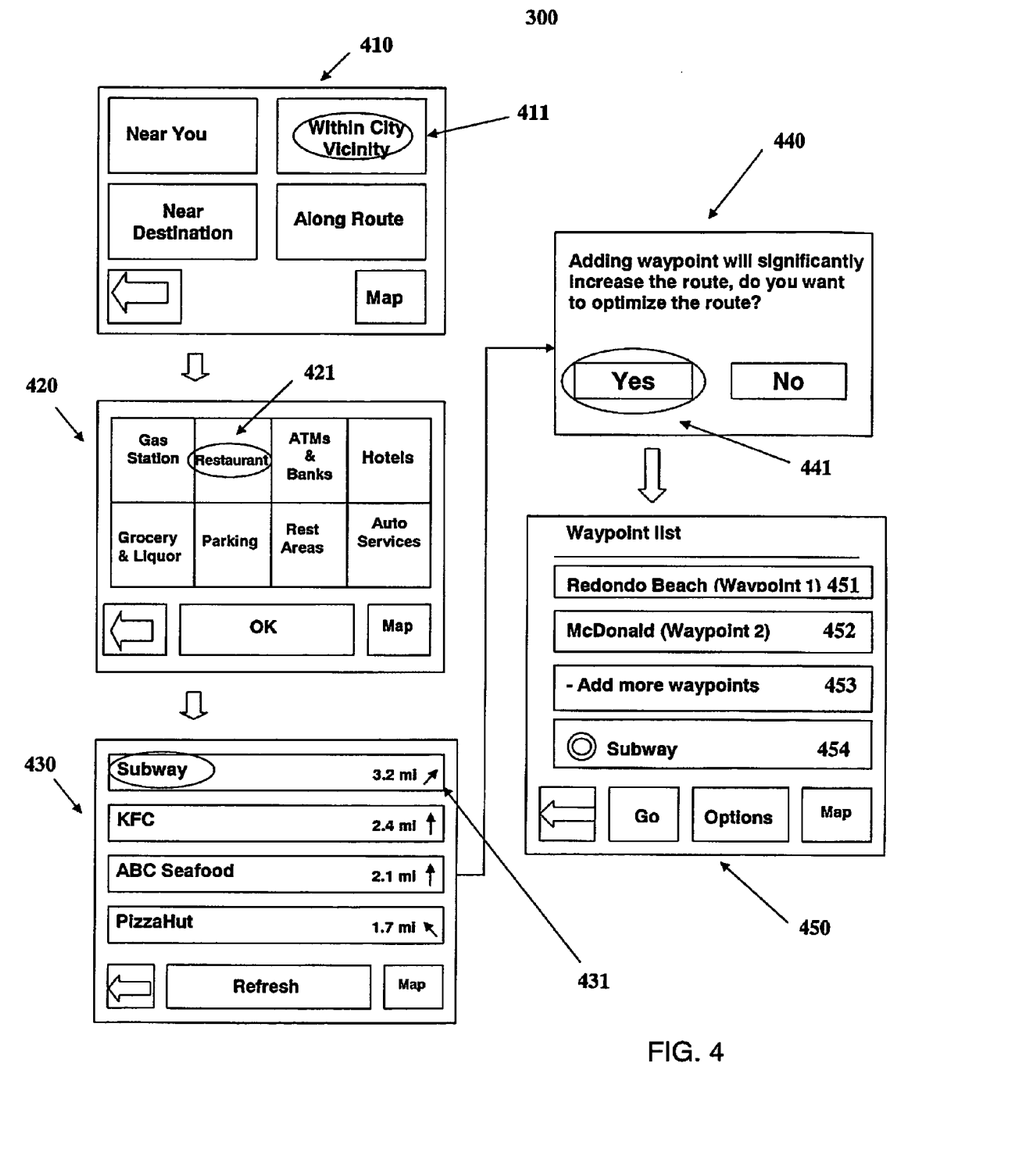
FIG. 4 illustrates another embodiment of the present invention regarding the setting of multiple waypoints or POIs in the navigation system when adding one of the waypoints will significantly increase the overall distance or cost of the route where screens 410, 420, 430, 440 and 450 will be displayed by the navigation system during the route planning process.

As exemplified in FIG. 4, assuming that the driver has already set a waypoint "McDonald" 452 and a destination "Redondo Beach" 451, and if the driver is trying to add a POI as another waypoint. It is also assumed that such an additional POI, in this case, is within the city vicinity, but not necessarily along the current route, thus, the driver selects "Within City Vicinity" 411 shown on a screen 410. Similar to FIG. 3*a*, the navigation system 300 displays a screen 420 which provides plurality of POI categories including Gas Station, Restaurant, and Hospital, etc.

If, for example, the driver again selects the category of "Restaurant" 421, then the navigation system shows a screen 430 which provides detailed information about the restaurants within the city vicinity. After the driver selects "Subway" 431, the computation unit 303 starts calculating and comparing the distance of the existing route with a new route that includes the newly added waypoint "Subway" 431. A notifying message inside a pop-up window 440 may appear if the route planning processor 302 receives the routing information from the computation unit 303 and determines that adding "Subway" 431 significantly increases the overall cost of the route.

The notifying message will be generated when the cost (distance, travel time, etc.) of the new route is increased by more than the predetermined threshold level. As noted above, an example of the predetermined threshold level is 25%, and the driver is able to change the threshold level with his preference. Based on the notifying message, the driver may decide either he wants to proceed by clicking a "Yes" (441) button, or refuse by clicking on a "No" button on the pop-up window 440.

As illustrated above, before adding the second POI, the original route includes the destination "Redondo Beach" 451 and one waypoint "McDonald" 452. If the driver decides to proceed (by clicking on "Yes" 441), the computation unit 303 again calculates and compares the distances and other costs of every possible route (covering the destination and all the waypoints or POIs). Thus, an optimized route is determined by the route planning processor 302 so that the optimized route includes the newly added POI as a tentative or final destination.

In this case, the optimized route based on the information above, can be shown on a screen 450: the original destination "Redondo Beach" 451 now becomes waypoint 1, "McDonald" 452 becomes waypoint 2, and the newly added POI "Subway" becomes the new (final) destination 454. Furthermore, the navigation system 300 allows the driver to add more waypoint (453) on the screen 450 even after the optimized route has been shown. If the driver decides to add more waypoints, the navigation system 300 will repeat the process illustrated above to generate an optimized route to accommodate the newly-added waypoints.

Figure 5:
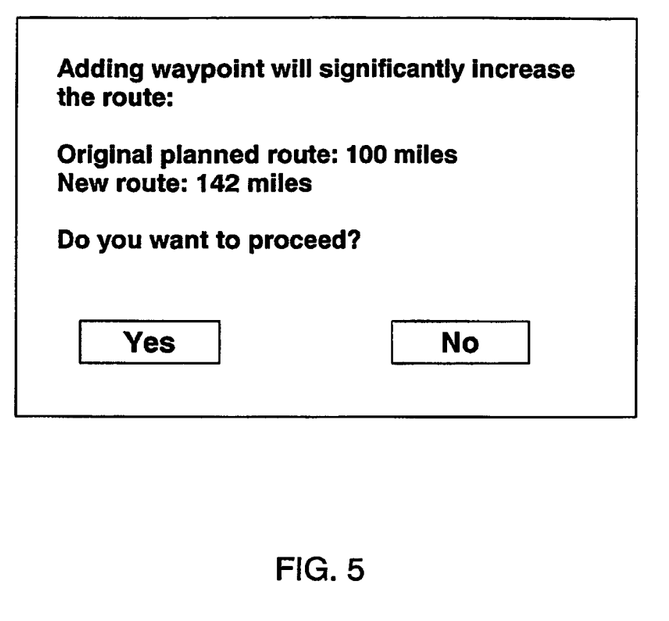
FIG. 5 is a schematic diagram showing an example of navigation display which provides the driver a message when adding the waypoint significantly increases the distance or other cost of the route.

FIG. 5 is a schematic diagram showing an example of navigation display which provides the driver a message when adding the waypoint significantly increases the distance or cost of the route. In this embodiment, the notifying message includes actual mileage generated by the computation unit 303 (FIG. 3). For example, such information as to mileage include for both the original route and the new route (assuming the threshold is 25%, as discussed above), to provide the driver more accurate information to decide whether to proceed to the new POI.

FIG. 6 is a flow chart illustrating an example of operational steps in the method of setting multiple waypoints or POIs in which adding one of the waypoints will significantly increase the route. In step 610, provided that the driver has already set at least one waypoint besides the destination, the driver is allowed to add more waypoint(s) along the route in step 620, such as through the "Add more waypoints" button 353 or 453 in FIG. 3*a* or FIG. 4*a*, respectively. If the driver decides to add more waypoint or POI, some POI categories shown in either the screen 320 or 420 (such as Restaurant, Gas station, Hotel, etc.) are provided to the driver in step 630.

Also in step 630, once the driver selects a specific POI category, detailed information regarding that the selected POI category will also be provided to the driver. For example, if the driver selects "Restaurant" as his interested POI category, the detailed information about restaurants along the route, such as names, telephone numbers, distances from the vehicle current location, etc., will be provided to the driver in step 630.

After the driver selects and adds the new waypoint or POI in step 640, the computation unit 303 starts calculating and comparing the cost (ex. distance, travel time, fee, etc.) of the existing route with that of any possible new routes as depicted in step 650. The route planning processor 302 determines whether adding the new waypoint or POI will significantly increase the cost of the route or not in step 660. If it is determined that adding the new waypoint or POI will not significantly increase the cost of the route, a notifying message is provided in step 670 so that the driver is able to prioritize (select the order of) the existing and new waypoints or POIs. The threshold level for determining the "significantly increase" is discussed above, which is, as an example 25%.

An optimized route is generated by the route planning processor 302 after the driver prioritizes the waypoints or POIs. For example, like the example of FIG. 3a, after the driver selects and adds "PizzaHut" 331 as the new waypoint, the notifying message in the pop-up window 340 is provided to the driver to prioritize the waypoints. Thus, an optimized route is subsequently generated by the route planning processor 302 on the screen 350 based on the driver's preference in prioritizing the waypoints.

On the other hand, if the route planning processor 302 determines that adding the new waypoint or POI significantly increases the route, another notifying message will be generated in step 770 as depicted in FIG. 7.

FIG. 7 is a flow chart illustrating another example of operational steps in the method of setting multiple waypoints or POIs in which adding one of the waypoints will significantly increase the route. In the flow chart of FIG. 7, steps 710, 720, 730, 740, 750 and 760 are basically the same as the steps 610, 620, 630, 640, 650 and 660 in FIG. 6. In the present embodiment, adding a new waypoint or POI will significantly increase the overall cost of the route based on the routing information provided by the computation unit 303. Therefore, a notifying message is generated by the route planning processor 302 in step 770 to provide an option to the driver whether to proceed to the new waypoint or POI as shown in step 780.

If the user decides to proceed as to the new waypoint or POI, in step 790, the computation unit 303 again calculates and compares every possible route covering the destination and all POIs, and the route planning processor 302 selects an optimized route based on the routing information provided by the computation unit 303. However, if the driver does not want to further proceed to the new waypoint or POI, the driver can either select another waypoint or POI by repeating the steps 720 to 760, or the driver can simply stay on the originally planned route, without adding any new waypoint or POI.

If the route planning processor 302 determines that adding new waypoint or POI does not significantly increase the route in step 760, the notifying message in step 660 will be provided to the driver to prioritize the waypoints or POIs. Thus, the process moves to the steps 670 and 680 in the flow chart of FIG. 6.

As has been described above, according to the present invention, the route planning apparatus and method for a navigation system allows the driver to add, select, and prioritize the waypoints such as POIs, and provides a notifying message to let the driver know when adding the waypoint or POI would significantly increase the overall distance, time, etc. of the route. The route planning method and apparatus for a navigation system allows the driver to plan the route by adding and prioritizing multiple waypoints or POIs based on the driver's preferences. The navigation system of the present invention provides a function for notifying a message to the driver when adding a new waypoint or POI may significantly increase the length of the route or burden of driving the route, such that the driver can decide whether to proceed to the POI or waypoint, or to avoid the unnecessary routing.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A navigation system for route planning and route guidance, comprising:
    a display unit;
    an information receiver configured to receive information about current location of a vehicle;
    at least one database to store and provide maps, road networks, geographical features, and point-of-interest (POI) information; and
    a route planning processor for calculating and determining a route between a destination and a current vehicle position,
    wherein when a point is set up on a map unit via an input device after the route is generated by the route planning processor, the point is recognized as a waypoint on the route, and an optimized new route including the waypoint is generated by the route planning processor;
    wherein the route planning processor comprises a computation unit, which is configured to generate routing information by calculating and comparing a distance of an existing route with a distance of the new route; and
    wherein the notifying message is provided to the driver to decide whether to proceed to the new waypoint or POI when the route planning processor determines that adding the new waypoint or POI increases the distance of the route by a predetermined threshold value, according to routing information provided by the computation unit.

2. The navigation system of claim 1, wherein a notifying message is provided to a driver to prioritize the waypoints or POIs when the route planning processor determines that adding the new waypoint or POI does not increase the distance of the route by a predetermined threshold value, according to the routing information provided by the computation unit.

3. The navigation system of claim 2, wherein the optimized new route is generated by said route planning processor based on the driver's preference in prioritizing the waypoints or POIs.

4. The navigation system of claim 2, wherein the computation unit calculates and compares the distance of every possible route and provides the routing information to the route planning processor to generate the optimized new route when the driver decides to proceed to the new waypoint or POI.

5. The navigation system of claim 2, wherein the predetermined threshold value of the distance increase is set by the navigation system or the driver.

6. The navigation system of claim 1, wherein the route planning processor generates the route by incorporating the routing information, map and road network information retrieved from the database, and information of current vehicle position received by the information receiver from a global positioning system (GPS).

\* \* \* \* \*